United States Patent
Cucinotta et al.

(10) Patent No.: US 9,674,153 B2
(45) Date of Patent: Jun. 6, 2017

(54) SECURE DATA PROCESSING

(71) Applicant: Alcatel Lucent, Boulogne Billancourt (FR)

(72) Inventors: Tommaso Cucinotta, Dublin (IE); Davide Cherubini, Dublin (IE); Eric B. Jul, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/399,372

(22) PCT Filed: May 31, 2013

(86) PCT No.: PCT/EP2013/001603
§ 371 (c)(1),
(2) Date: Nov. 6, 2014

(87) PCT Pub. No.: WO2013/182286
PCT Pub. Date: Dec. 12, 2013

(65) Prior Publication Data
US 2015/0089589 A1    Mar. 26, 2015

(30) Foreign Application Priority Data
Jun. 7, 2012   (EP) .................................... 12360045

(51) Int. Cl.
*G06F 7/04* (2006.01)
*G06F 15/16* (2006.01)
(Continued)

(52) U.S. Cl.
CPC ............ *H04L 63/04* (2013.01); *G06F 21/602* (2013.01); *G06F 21/74* (2013.01); *H04L 63/0281* (2013.01); *H04L 63/0428* (2013.01)

(58) Field of Classification Search
CPC ...................................................... G06F 21/00
(Continued)

(56) References Cited

U.S. PATENT DOCUMENTS 5,915,025 A    6/1999   Taguchi et al.
6,836,847 B1   12/2004  Zinger et al.
(Continued)

FOREIGN PATENT DOCUMENTS

CN    1656432    8/2005
EP    1370084    12/2003

OTHER PUBLICATIONS

Cheswick, W. R. et al; Firewalls and Internet Security, Second Edition; 2003; Addison-Wesley, USA; XP002713573; pp. 236-324.
(Continued)

*Primary Examiner* — Taghi Arani
*Assistant Examiner* — Khalil Naghdali
(74) *Attorney, Agent, or Firm* — Patti & Malvone Law Group, LLC

(57) ABSTRACT

A secure data processing apparatus and method are disclosed. The secure data processing apparatus is operable to securely process user data provided by a user and includes a trusted domain having a trusted bus; a trusted domain controller coupling the trusted bus with an untrusted bus of an untrusted domain, the trusted domain controller being operable to ensure that encrypted incoming user data received over the untrusted bus is decrypted and provided over the trusted bus as the incoming user data and to ensure that outgoing user data is encrypted and provided over the untrusted bus as encrypted outgoing data. The trusted domain controller that only encrypted data is provided in the untrusted domain reducing the chance of the data being compromised. The trusted domain controller ensures that access to the unencrypted data within the trusted domain can
(Continued)

be avoided. Confidentiality of the data can be assured without performance shortfalls.

10 Claims, 1 Drawing Sheet

(51) Int. Cl.
*G06F 17/30* (2006.01)
*H04L 29/06* (2006.01)
*G06F 21/60* (2013.01)
*G06F 21/74* (2013.01)

(58) Field of Classification Search
USPC .............................................................. 726/3
See application file for complete search history.

(56) References Cited

U.S. PATENT DOCUMENTS

| | | | | |
|---|---|---|---|---|
| 7,028,149 B2* | 4/2006 | Grawrock | ............... | G06F 21/00 365/189.12 |
| 7,716,720 B1* | 5/2010 | Marek | ..................... | G06F 21/74 380/28 |
| 8,839,004 B1* | 9/2014 | Bennett | ................... | G06F 21/00 713/189 |
| 2007/0199046 A1 | 8/2007 | O'Brien | | |
| 2007/0283170 A1* | 12/2007 | Yami | ..................... | H04L 9/0866 713/193 |
| 2008/0114666 A1* | 5/2008 | Jiao | ........................ | G06Q 20/10 705/26.1 |
| 2008/0282342 A1* | 11/2008 | Hatakeyama | ....... | G06F 12/1491 726/17 |
| 2009/0113202 A1* | 4/2009 | Hidle | .................. | H04L 63/0428 713/151 |
| 2010/0241848 A1* | 9/2010 | Smith | .................... | G01D 4/004 713/153 |
| 2012/0036351 A1* | 2/2012 | Peet, Jr. | ................ | G06F 15/167 713/150 |
| 2013/0124874 A1* | 5/2013 | Kudelski | ................ | G06F 21/70 713/189 |

OTHER PUBLICATIONS

Hao, J. et al; Trusted Block as a Service: Towards Sensitive Applications on the Cloud; Trust, Security and Privacy in Computing and Communications (TRUSTCOM), 2011 IEEE 10th International Conference on, IEEE, Nov. 16, 2011; pp. 73-82; XP032086787; DOI: 10.1109/TRUSTCOM.2011.13; ISBN: 978-1-4577-2135-9.

* cited by examiner

SECURE DATA PROCESSING

FIELD OF THE INVENTION

The present invention relates to a secure data processing apparatus and a method.

BACKGROUND

Secure data processing is known. Secure data processing is particularly important in distributed computing architectures, such as those used by cloud computing. When performing such cloud computing, any code sent to a remote computer in the cloud and any user data sent to be remotely processed, as well as the data output from the remote data processing operations typically needs to remain confidential.

Although various techniques exist to try to protect the confidentiality of such data, they each have their own shortcomings.

Accordingly, it is desired to provide an improved technique for performing secure data processing.

SUMMARY

According to a first aspect, there is provided a secure data processing apparatus operable to securely process user data provided by a user, the secure data processing apparatus comprising: a trusted domain comprising a trusted bus coupled with a trusted data processing apparatus operable to process incoming user data received over the trusted bus and to generate outgoing user data; a trusted domain controller coupling the trusted bus with an untrusted bus of an untrusted domain, the trusted domain controller being operable to ensure that encrypted incoming user data received over the untrusted bus is decrypted and provided over the trusted bus as the incoming user data and to ensure that outgoing user data is encrypted and provided over the untrusted bus as encrypted outgoing data.

The first aspect recognizes that isolation between execution environments and trust is traditionally targeted by memory protection hardware mechanisms that allow the operating system to isolate, from the security viewpoint, the execution environments of different users. This attempts to ensure that unprivileged users cannot access each other's data and also that they cannot overcome decisions and configurations made by the system administrators. This is typically achieved by the operating system kernel performing a proper configuration of the memory management unit whenever switching a users process, so that the process can access only a subset of the physical memory available in the system and with the proper read-only restrictions, if needed. However, the first aspect recognises that this mechanism still allows the processor to have a special mode of operation (the so-called "Ring o") in which there is no restriction in what the running code can do. This Ring o is used to setup and administrate isolated execution of each process and thus the software running in Ring o must be trusted. Unfortunately, in traditional operating systems, malicious attackers have succeeded in exploiting bugs in the operating system kernel and system calls implementations, thus permitting for example an unprivileged process to gain administrator privileges on the operating system, and ultimately be able to subvert any security policy in the system. Also, bugs in the system processes and services acting as privileged processes in the operating system can be used to execute malicious code that could subvert the operating system security policy configuration. Furthermore, a malicious system administrator can control the software to be executed in Ring o and thus can inject malicious software that bypasses the normal operating system security.

Similarly, in virtualized environments such as those found in cloud computing infrastructures, traditional memory protection can be utilized to isolate the execution of different virtual machines from each other. The virtual machine monitor or hypervisor embeds code that exploits the special mode of operation of the available processors in order to perform system management actions. However, the first aspect recognises that attackers may exploit bugs in the hypervisor and hyper calls implementations in order to break the isolation properties (across different virtual machines) of such a system. The owner of the infrastructure, who usually has administrative access on the physical nodes can actually access any data managed by the hosted virtual machines. Users of a cloud provider are therefore forced to trust the provider, if they want to hand over any kind of computation to the cloud.

Cryptographic mechanisms, such as homomorphic encryption, strive to remove this constraint by allowing a cloud provider to perform computations on encrypted data without being able to understand the data contents. However, such techniques are limited in scope to a limited set of operations on the data. Furthermore, they are still preliminary and their effectiveness and usability is undemonstrated.

Another approach uses trusted platform module technology. However trusted platform modules merely ensure that a remote system cannot have been tampered with by, for example, ensuring that the software components involved in a boot chain have not been modified. However, this again provides no guarantees in the case of bugs within the software.

Another approach is to use a processor which is associated with a cryptographic memory management unit so that a secure processor can operate on data that is kept in encrypted form. However, the overheads associated with the need to perform real-time encryption and decryption can be high since the encryption and decryption functionality needs to be utilized for each and every cache miss.

Accordingly, a secure data processing apparatus is provided. The secure data processing apparatus may be operable to securely process data which is provided by a user. The secure data processing apparatus may comprise a trusted domain. The trusted domain may comprise a trusted bus which may be coupled with a trusted data processing apparatus. The trusted data processing apparatus may be able to process incoming user data received over the trusted bus and may generate outgoing user data. The secure data processing apparatus may also comprise a trusted domain controller. The trusted domain controller may couple the trusted bus with him and trusted bus of an untrusted domain. The trusted domain controller may ensure that the encrypted incoming user data received over the untrusted bus is decrypted. The trusted domain controller may provide the decrypted incoming user data as the incoming data over the trusted bus. The trusted domain controller may also ensure that outgoing user data is encrypted and provided over the untrusted bus as encrypted outgoing data.

By providing a trusted domain controller which couples the trusted bus with an untrusted bus and ensures that incoming user data is decrypted whilst outgoing user data is encrypted, encrypted data is only ever provided in the untrusted domain which reduces the chance of the data being compromised and ensures that only decrypted data is processed within the trusted domain which improves the performance of the processing within the trusted domain. By providing the trusted domain controller as the conduit between the trusted and untrusted domain, access to the unencrypted data within the trusted domain can be avoided. Accordingly, the confidentiality of the data can be assured without any associated processing performance shortfalls.

In one embodiment, the trusted domain controller provides a sole interface between the trusted domain and the untrusted domain. By providing the trusted domain controller as the only interface between the trusted and untrusted domain, the encryption and decryption of data can be assured and access to the data within the trusted domain by any other routes can be avoided thereby avoiding access to the unencrypted data within the trusted domain. It will be appreciated that in embodiments, the trusted domain controller provides the only physical access to the trusted domain.

In one embodiment, all data transfers between the trusted domain and the untrusted domain occur through the trusted domain controller. Accordingly, all data transfers can only ever occur through the trusted domain controller to ensure that the appropriate encryption and decryption occurs to prevent any unencrypted data from exiting the trusted domain.

In one embodiment, data transfers between the trusted domain and the untrusted domain are forcibly encrypted and decrypted by the trusted domain controller. Accordingly, all transfers are mandatorily encrypted or decrypted to preserve the integrity of the user data.

In one embodiment, the trusted domain controller comprises non-reprogrammable cipher hardware operable to perform encryption and decryption on the data transfers between the trusted domain and the untrusted domain. Accordingly, the encryption and decryption processes may be hardwired into the trusted domain controller so that no software override or reprogramming of these functions is possible to avoid any malicious code overwriting the requirement for data leaving the trusted domain to be encrypted.

In one embodiment, the trusted domain controller is operable to perform encryption and decryption on data transfers between the trusted domain and the untrusted domain using respective non-reprogrammable encryption and decryption logic.

In one embodiment, the encryption and decryption logic utilises a session key exchanged with the user. By exchanging a session key with the user, only the user and the trusted domain controller are able to decrypt or encrypt data transmitted between the secure data processing apparatus and the user. It will be appreciated that the establishment of such key should not rely on any trusted piece of software and the behaviour of the trusted domain controller should not be alterable or reconfigurable except for the reconfiguration of the session key.

In one embodiment, the users confidentially send to the trusted domain controller the session key, by which the trusted domain controller reconfigures itself by hardware mechanisms.

In one embodiment, such confidential send operation happens remotely by imprinting the trusted domain controller from the fabric with a private cryptographic key corresponding to a public cryptographic key that is published, certified and/or revoked by a certification authority that is trusted by the user.

In one embodiment, the users use the public key to encrypt a message containing the session key to be reconfigured in the trusted domain controller.

In one embodiment, the trusted domain controller, on receipt of the encrypted message, decrypts it using the imprinted private cryptographic key, and reconfigures the trusted domain controller with the decrypted session-key provided by the user.

In one embodiment, the trusted data processing apparatus comprises at least one processing unit and non-cache memory. Accordingly, the trusted domain may provide a complete data processing apparatus rather than just being a subset part of a particular processor.

In one embodiment, the incoming user data comprises data and executable code. Accordingly, both executable code and data may be transmitted between the user and the secure data processing apparatus. This enables the user to utilize the resources of the secure data processing apparatus to perform data processing tasks on the user's behalf.

In one embodiment, the trusted data processor is operable to process unencrypted data by executing unencrypted executable code. Accordingly, the trusted processor may operate normally by performing data processing on unencrypted code and data. It will be appreciated that this enables the trusted data processor to function to its normal maximum performance levels.

In one embodiment, the trusted domain controller is operable, in response to a request to reconfigure the trusted domain, to delete user data within the trusted domain. Accordingly, whenever a reconfiguration of the trusted domain is to occur, the content of the trusted domain is cleared or flushed.

In one embodiment, the trusted domain controller is operable to delete user data within the trusted domain prior to reconfiguring the trusted domain. Accordingly, information within the trusted domain is deleted prior to the domain being reconfigured to be used by another user or by another user session.

In one embodiment, the trusted domain controller comprises non-reprogrammable reset hardware operable to provide a hardware-controlled reset of the trusted domain in response to the request to reconfigure the trusted domain. Accordingly, the reset function may be hardwired into hardware in order to prevent any malicious software manipulation which may otherwise prevent such a clearing or flushing of the contents within the trusted domain from occurring.

In one embodiment, the request to reconfigure the trusted domain comprises a change in the session key.

In one embodiment, the request to reconfigure the trusted domain comprises a change in the session key which disables encryption and decryption.

According to a second aspect, there is provided a method of securely processing user data provided by a user, the method comprising: processing incoming user data received over a trusted bus and generating outgoing user data; coupling the trusted bus with an untrusted bus of an untrusted domain using a trusted domain controller to ensure that encrypted incoming user data received over the untrusted bus is decrypted and provided over the trusted bus as the incoming user data and to ensure that the outgoing user data is encrypted and provided over the untrusted bus as encrypted outgoing data.

In one embodiment, the trusted domain controller provides a sole interface between the trusted domain and the untrusted domain.

In one embodiment, all data transfers between the trusted domain and the untrusted domain occur through the trusted domain controller.

In one embodiment, the method comprises forcibly encrypting and decrypting data transfers between the trusted domain and the untrusted domain using the trusted domain controller.

In one embodiment, the method comprises performing encryption and decryption on the data transfers between the trusted domain and the untrusted domain using non-reprogrammable cipher hardware of the trusted domain controller.

In one embodiment, the method comprises performing encryption and decryption on data transfers between the trusted domain and the untrusted domain using respective non-reprogrammable encryption and decryption logic of the trusted domain controller.

In one embodiment, the method comprises utilising a session key exchanged with the user.

In one embodiment, the method comprises users confidentially sending to the trusted domain controller the session key, by which the trusted domain controller reconfigures itself by hardware mechanisms.

In one embodiment, such confidential sending happens remotely by imprinting the trusted domain controller from the fabric with a private cryptographic key corresponding to a public cryptographic key that is published, certified and/or revoked by a certification authority that is trusted by the user.

In one embodiment, the users use the public key to encrypt a message containing the session key to be reconfigured in the trusted domain controller.

In one embodiment, the trusted domain controller, on receipt of the encrypted message, decrypts it using the imprinted private cryptographic key, and reconfigures the trusted domain controller with the decrypted session-key provided by the user.

In one embodiment, the trusted data processing apparatus comprises at least one processing unit and non-cache memory.

In one embodiment, the incoming user data comprises data and executable code. In one embodiment, the method comprises processing unencrypted data by executing unencrypted executable code.

In one embodiment, the method comprises, in response to a request to reconfigure the trusted domain, deleting user data within the trusted domain.

In one embodiment, the method comprises deleting user data within the trusted domain prior to reconfiguring the trusted domain.

In one embodiment, the method comprises providing a hardware-controlled reset of the trusted domain in response to the request to reconfigure the trusted domain.

In one embodiment, the request to reconfigure the trusted domain comprises a change in the session key.

In one embodiment, the request to reconfigure the trusted domain comprises a change in the session key which disables encryption and decryption.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
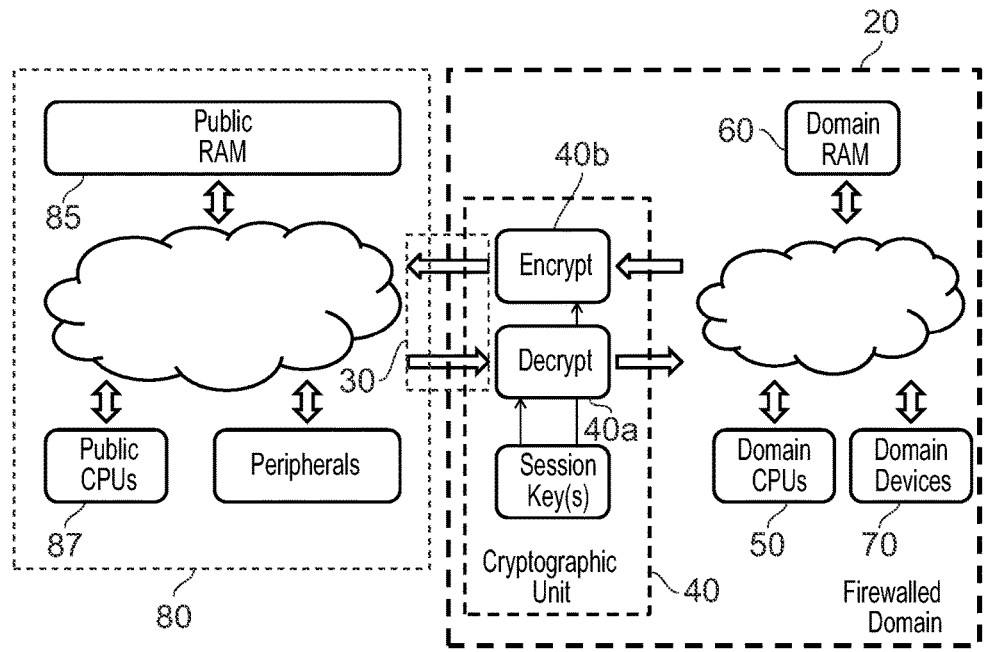
FIG. 1 illustrates the main elements of the Firewalled Domain of Execution architecture according to one embodiment.

Before discussing the embodiments in any more detail, first an overview will be provided. As mentioned above, there is a need to provide improved protection of confidential data, particularly in cloud computing applications, or other distributed computing arrangements. For many applications, both the code sent to a remote computer (for example in the cloud) and the data to be remotely processed, as well as the output data generated from the remote processing operations needs to remain confidential. The data and code transported to and from the remote computer can readily be encrypted in order to preserve security and confidentiality. However, it is often necessary that a user needs to trust both the remote computer as well as its system administrators to maintain confidentiality.

System administrators may have access to data and code sent to the remote computers and untrusted and potentially malicious software may run on such remote computers and gain access to the data. Even if the data is encrypted, in many cases decrypted versions all the keys used in the encryption may be accessible within the remote computer. Accordingly, a loss of confidentiality can occur if it is possible to access the processing of any unencrypted data within the remote computer or to output that data in an unencrypted form.

Accordingly, embodiments provide a hardware mechanism which is hardwired to create a trusted environment in which it is possible to ensure confidential execution of code and confidential processing of data despite operating in an otherwise untrusted environment. Embodiments provide, on a physical computing machine, one or more protected or trusted computing domains (referred to as a Firewalled Domain of Execution (FDE)). Within the FDE confidential data is processed in unencrypted, plaintext form at the native computing speed achievable on the physical platform. Likewise, confidential code is executed in unencrypted, plaintext form at the native computing speed achievable on the physical platform. Any data flow from within the FDE to the outside (and potentially untrusted world or domain) is forcibly encrypted so that only authorized users can access it. Any reconfiguration of the FDE to allow different users to exploit its computing capabilities, including initialization after reset results in the whole contents of the FDE, including any memory and hardware state is forcibly cleared so that a new user of the FDE cannot find any residual traces of data or code that was processed by a previous user.

Accordingly, it can be seen that data (which may be code and/or user data) is in unencrypted form within the FDE or trusted domain to enable normal processing to occur within that trusted domain using data processing apparatus such as one or more processor cores, associated memory and required devices or peripherals. Information passing between the trusted domain and the outside world (untrusted domain) can only occur through a trusted cryptographic hardware unit (TCU) that enforces encryption and decryption any time data moves in or out of the FDE. The FDE and TCU are built using hardware that cannot be compromised using software (for example, a single chip is a possible implementation).

Sensitive data (or code) is shipped to the FDE in encrypted form and is decrypted once by the TCU when data is moved into the FDE. That unencrypted data or code is then stored it in the FDE random access memory (RAM) and processed or executed in unencrypted form within the FDE. Any resultant data is then transmitted back to the end user (or stored on a disk for later processing) in encrypted form as the TCU enforces encryption when any data leaves the FDE. Accordingly, all data transactions between the FDE and the outside world or untrusted domain can only occur through the TCU which performs decryption on all incoming data and encryption on all outgoing data. The TCU provides the only or sole interface with the FDE so that data cannot be accessed from within the FDE in any other way. Also, because the TCU is realized in hardware, it is not possible to prevent the TCU from performing this encryption and decryption so as to compromise the data within the FDE.

All the processing performed within the FDE runs at the native computing capability speed, without any need for encryption or decryption at each and every access to the RAM. As mentioned above, any attempt to output data from within the FDE causes forcibly encryption by the hardware, making it impossible to disclose information to the untrusted domain or environment, even in the presence of bugs in the software running within the FTE, or attempts to insert malicious pluggable hardware into the physical computing machine. Furthermore, when switching users using an FDE, all of the FDE contents are forcibly cleared and reset to an initial state. This ensures that no information leakage is possible when switching users that access the FDE.

Firewalled Domain of Execution

FIG. 1 illustrates the main elements of the FDE architecture. The Firewalled Domain of Execution 20 is a trusted domain which is part of a standard computer system which is, for example, mounted on a personal computer motherboard. The standard computer system controls the communication with the outside world or untrusted domain 80 and supports the operation and initialization of the FDE 20. In one embodiment, the FDE 20 is contained entirely within a single hardware unit, for example being part of a single chip, and the only access lines 30 to and from the FDE 20 are through the TCU 40.

The TCU 40 is provided with built-in cryptographic material that is typically stored in a tamper-proof part of the chip, which enables confidential and trusted communication with it by potential users. The TCU 40 is designed and hardwired so as to never disclose this built-in cryptographic material to outside of the FDE 20. This enables potential users to send code and/or data confidentially to a specific FDE to be processed. Also, users may exploit this built-in material to send further cryptographic material useful for encrypting its own code and data confidentially to the FDE 20. For example, an asymmetric encryption key may be provided enabling fast encryption/decryption of large amounts of data and/or code. Furthermore, the TCU 40 may optionally support verification of the received data and contents by users following cryptographic verification using, for example, digital signatures, as is explained in more detail below.

All incoming communication passes through decryption hardware 40A which is hardwired to decrypt the received data from the untrusted domain 80 and provides that unencrypted data to the trusted data processing apparatus within the FDE 20 which comprises one or more processors 50, associated RAM 60 and devices 70. All data and code within the FDE 20 is processed in unencrypted form which avoids any delays that may otherwise occur when attempting to perform secure processing of code and/or data in encrypted form. Accordingly, it can be seen that the FDE 20 may provide a complete data processing apparatus or system comprising whatever resources may be required to support the processing required by the user. In this example, the FDE 20 is contained on a single chip that is mounted on an existing, standard motherboard running a complete standard operating system such as Windows, Linux or other operating system.

All data flowing out of the FDE 20 must pass through the encryption hardware 40B which is hardwired to forcibly encrypt the data before providing this to the untrusted domain 80. This ensures that only data in its encrypted form exists within the untrusted domain 80. By hardwiring the TCU 40 to perform decryption and encryption, and by only having the TCU interposed on the sole single interface between the trusted and untrusted domains, the ability to access or output data in unencrypted form is obviated.

Cloud Deployment

Figure 2:
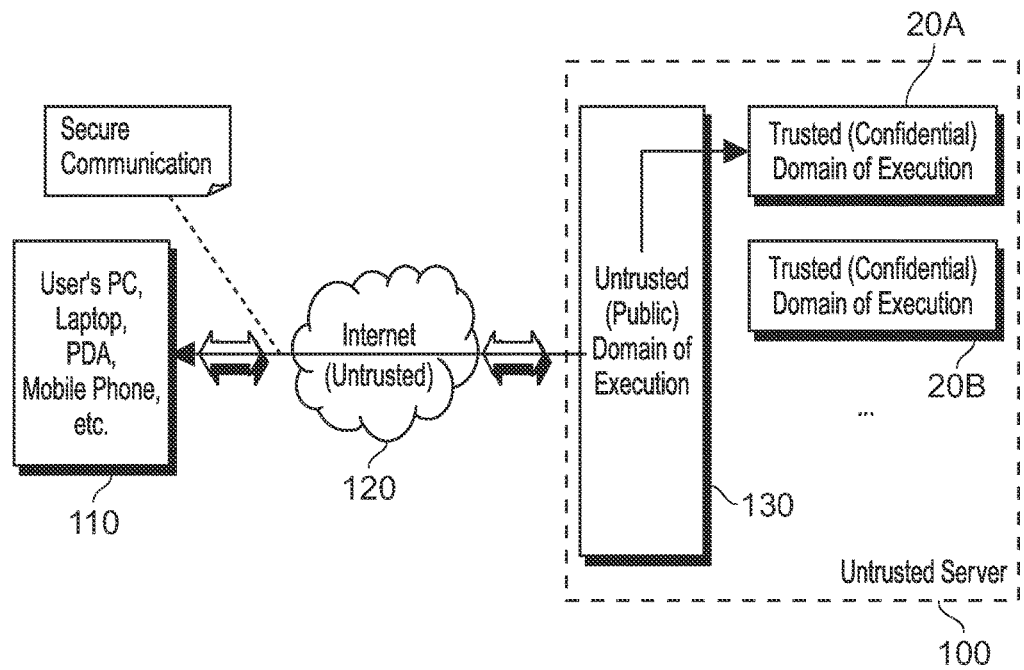
FIG. 2 illustrates a cloud computing deployment according to one embodiment.

FIG. 2 illustrates a possible usage scenario where a user 110 hands over confidential code and data for processing on a remote and trusted server 100, which may be made available by a cloud provider. In particular, multiple FDEs may be mounted on the same physical system and may be managed by the same operating system, if needed. Due to the use of the built-in cryptographic material, the remote user 110 can securely and confidentially communicate with a target FDE 20A; 20B, despite the traversal of untrusted networks, such as the Internet 120 and untrusted computing elements (such as an untrusted public domain of execution 130) residing on the same physical machine as the FDE 20A; 20B. This secure communication is achieved through the secure exchange of one or more keys with the trusted server 100 and the encryption of the confidential code and data.

In the arrangement shown in FIG. 2, there are multiple FDEs 20A; 20B provided in the same physical server 100. Such an implementation may be suitable for a cloud provider that wants to provide a large number of independent FDEs to its customers.

It will be appreciated that this approach does not protect against sophisticated physical attacks to the hardware, such as attempting to access the chips using electronic microscopy or similar. However, if the FDE is entirely contained on a single chip, such attacks are extremely difficult and they may be made near impossible by utilizing tamper-proof manufacturing, such as is used in smart-card or trusted platform module devices. Also, this approach can be coupled with third-party certification processes which verify periodically that the computing equipment of a cloud provider is not altered nor used in conjunction with suspicious or malicious hardware elements in order to further improve security.

In embodiments, the cloud provider has means for authenticating users and billing their use of the resources; therefore, the above approach should in no way exclude the possibility to add more complexity to the messages, so that the user can be properly authenticated by the provider when sending their session-key and data/software to the trusted domain for processing.

Ciphering

Each TCU 40 is preconfigured by the manufacturer with a unique built-in asymmetric key pair, where the private key PrivK-FDE is injected into the TCU 40 during manufacture and stored in tamper-resistant hardware, such as a trusted platform module, whilst the corresponding public key PubK-FDE is made available for application developers and/or users through public-key certificates.

The FDE 20 is initialized on receipt of a symmetric user key K-User encrypted with the public key PubK-FDE of the FDE 20. This ensures that only the intended FDE can receive the user key and use it. The symmetric user key K-User is not available to the processors 50, RAM 60 or devices 70 within the FDE 20. Such initialization clears, flushes or resets all of the data and code within the FDE 20 using hardware mechanisms in order to remove any residual traces of any data or code that may have previously existed within the FDE 20. This ensures that no previous data or code is accessible to another user.

Following initialization, the user then encrypts data and/or code using the user's symmetric key K-User and sends this to the FDE 20 to be confidentially processed. The TCU 40 decrypts the code and/or data encrypted with the user's symmetric key K-User and stores this unencrypted code and/or data inside the FDE 20 for further processing. Such processing can occur in unencrypted form order to speed the operation of the FDE 20.

Whenever the FDE 20 attempts to provide any data outside of the trusted domain within the FDE 20, this data is forcibly encrypted by the encryption hardware 40B using the user's symmetric key K-User. Such encrypted data can then be sent back to the user via the untrusted domain 80, or stored on, for example, a hard disk for later retrieval. This output data can be decrypted and understood only by someone with access to the user's symmetric key K-User, which may be either the user himself or any other FDE configured for confidential execution on behalf of that user. The legitimate user receiving the data output by the FDE 20 can then decrypt that data using the user's symmetric key K-User.

Whenever the FDE 20 is finished with computations on behalf of a given user, for example when the operating system wants to make the FDE's resources available to another user, a reconfiguration of the TCU 40 is needed. However, the TCU 40 configuration triggers a forced and unavoidable reset of all the resources inside the FDE 20. This hardware trigger clears, resets or flushes all of the RAM 60, the processors 50 and the devices 70. Thereafter, the FDE 20 has no residual code or data from a previous operation. The FDE 20 can then receive new code and/or data from the operating system which is encrypted and optionally signed as already described above.

As described above, the public and private keys for the FDE 20 are hardwired into the TCU 40 by the manufacturer of the FDE and the public key is made public and optionally signed by the manufacturer, so that any user can ascertain the origin of the FDE and verify that it is indeed the desired FDE. The manufacturer of the FDE must be trusted to produce an FDE that fulfils the specifications.

Authentication

As mentioned above, confidential exchange of data and/or code between a user and one or more FDEs can occur. To provide enhanced security, authentication of data exchanges may be added as well as introducing additional cryptographic material to be used by the TCU 40 to perform authentication of the exchange data and/or code for enabling it to enter the trusted domain of the FDE 20.

This may be achieved by allowing the user, at initialization, to also provide to the TCU 40 with a signature verification key VerK-User (which is encrypted using the FDEs public encryption key PubK-FDE), corresponding to the private signature key SigK-User held by the user. Using such a configuration, any further data and/or code received by the TCU 40 must be preliminarily verified for integrity before being accepted and copied within the FDE 20 for processing.

In such a case, the user sends data and/or code that needs to be executed remotely on an FDE by signing it with their signature key SigK-User and encrypting any messages with the symmetric key K-User previously configured. Within the FDE 20, the TCU 40 decrypts the users data and/or code because it knows PrivK-FDE, and it verifies the attached the digital signatures using the user's signature verification key VerK-User before excepting the data and/or code for execution within the FDE 20 to ensure that the data and/or code to be executed came from the intended user.

Additional cryptographic material may be configured at initialization of the TCU 40 in order to enable it to authenticate any data sent back to the user by applying a digital signature to it.

As mentioned above, the FDE 20 may embed a trusted platform module (TPM) chip, which is responsible for the secure storage and the use of long-term cryptographic material such as the private encryption key PrivK-FDE.

Trusted Cryptographic Unit

The TCU 40 has a special register into which the operating system can at any time write a new user's cryptographic information, such as the user's symmetric key K-User. As mentioned above, this results in a reset of the content of the FDE 20. The newly provided cryptographic material must be encrypted with the public encryption key of the FDE, PubK-FDE and is automatically decrypted by the TCU 40 (for example by using the associated TPM functionality).

The TCU 40 can move data from the public RAM 85 of the untrusted domain 80 into the FDE 20. In such a case, the transferred data is decrypted and optionally authenticated, as described above.

The TCU 40 can perform a number of well-defined interactions with the public CPUs 87 of the untrusted domain 80. For example, reads/writes of proper registers and/or direct memory access (DMA) transfers may be performed that allow for the enabling or disabling of the FDE 20. Also, the TCU 40 can overwrite the currently configured user's cryptographic material (for example the user's symmetric key K-User and the user's signature verification key VerK-User). The TCU 40 can load binary code chunks into the RAM 60, to be executed from the processor 50, where the code is decrypted using the configured public key PubK-FDE and optionally the signature of the code chunk is verified using the user's signature verification key VerK-User. The TCU 40 can start or commence execution of the loaded code within the FDE 20. The TCU 40 can transfer encrypted data from the public RAM 85 to the RAM 60 and during the transfer, the TCU 40 in forces decryption of the data using the configured public key of the FDE PubK-FDE and optionally the signature of the code chunk is verified using the user's signature verification key VerK-User. The TCU 40 can transfer data from the RAM 60 to the public memory 85 and during the transfer, the TCU 40 in forces encryption of the data using the PubK-FDE key.

At system power-on, the FDE 20 is reset with an invalid public key, effectively disabling it until it is to be used with an actual user's cryptographic material. Whenever a disabled FDE 20 is enabled, the processors 50, the memory 60 and any devices 70 are reset to a well-known state and their execution is suspended until the moment when the FDE receives the command that instructs the commencement of execution.

Distributed Computing

The approach illustrated in FIGS. 1 and 2 enables a user to handover complex and heavyweight computations to a cloud provider and those computations can be carried out in a distributed fashion with many FDEs cooperating with each other to realize confidential distributed computing algorithms. FDEs acting on behalf of the same user can be initialized by the user with the same symmetric key K-User so that the FDEs can exchange data with each other during the computations, enabling the secure realization of distributed client applications.

Isolation

The FDE 20 provides tight isolation characteristics. For example, it is not possible to dump the contents of the RAM 60 to disk, for example as part of a "hibernate" process. Also, the cryptographic material configured within the TCU 40 cannot be read from outside the TCU 40 by any means. Such material is protected with the highest security standards (for example by employing tamper-proof and tamper-resistant manufacturing processes).

Accordingly, it can be seen that letting users know that the hardware of a given cloud provider utilizes the embodiments described above allows them to establish a strong confidence that the provider has no means to spy on the data and/or code handed over to the cloud provider for remote processing. The guarantee of confidentiality of both the data and the computations performed on it as well as any resulting data is secured by well-established encryption algorithms and by hardware chips guaranteed by the manufacturer. This enables the usage of cloud computing in a whole new set of domains in which security concerns may otherwise hinder the potential application of cloud computing. The previous mechanisms, such as trusted computing, are intended to merely allow users to have confidence over which exact software stack a remote host within a cloud provider is running. However, this leaves the users exposed to possible attacks that that might corrupt a host software stack operation (for example due to a software bug), putting at risk the confidentiality of their data and code. The embodiments described above provide strong confidentiality guarantees at the hardware level. Should a break-in by an attacker occur from the outside, or should a malicious virtual machine running within the host occur, all an attacker can do is to steal encrypted data that cannot be decrypted due to the lack of the necessary decryption key or keys. This is a major change from existing systems where users need to trust not only the cloud provider, but also all of the cloud provider's employees and all of the software running on the cloud. Now, the user only needs to trust the chip manufacturer and trust that the public key encryption is secure.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A secure data processing apparatus operable to securely process user data provided by a user, said secure data processing apparatus comprising:
   a hardware-implemented trusted domain comprising a trusted bus coupled with a trusted data processing apparatus operable to process incoming user data received over said trusted bus and to generate outgoing user data;
   a hardware-implemented trusted domain controller coupling said trusted bus with an untrusted bus of an untrusted domain, said trusted domain controller being operable to ensure that encrypted incoming user data received over said untrusted bus is forcibly decrypted and provided over said trusted bus as said incoming user data and to ensure that outgoing user data is forcibly encrypted and provided over said untrusted bus as encrypted outgoing data, wherein said trusted domain controller is operable, in response to a request to initialize said trusted domain, to clear all data and executable code within said trusted domain and reset the secure data processing apparatus;

wherein said trusted domain controller comprises non-reprogrammable cipher hardware operable to perform encryption and decryption on said data transfers between said trusted domain and said untrusted domain; and wherein said trusted domain controller provides a sole interface between said trusted domain and said untrusted domain.

2. The apparatus of claim 1, wherein all data transfers between said trusted domain and said untrusted domain occur through said trusted domain controller.

3. The apparatus of claim 1, wherein said trusted domain controller is operable to perform encryption and decryption on data transfers between said trusted domain and said untrusted domain using respective non-reprogrammable encryption and decryption logic.

4. The apparatus of claim 1, wherein said incoming user data comprises data and executable code.

5. The apparatus of claim 1, wherein said trusted data processing apparatus is operable to process unencrypted data by executing unencrypted executable code.

6. The apparatus of claim 1, wherein said trusted domain controller comprises non-reprogrammable reset hardware operable to provide ahardware-controlled reset of said trusted domain in response to said request to initialize said trusted domain.

7. The apparatus of claim 3, wherein said encryption and decryption logic utilises a session key exchanged with said user.

8. The apparatus of claim 7, wherein said request to initialize said trusted domain comprises a change in said session key.

9. The apparatus of claim 7, wherein said request to initialize said trusted domain comprises a change in said session key which disables encryption and decryption.

10. A method of securely processing user data provided by a user in a hardware-implemented trusted domain comprising a trusted bus coupled with a trusted data processing apparatus operable to process incoming user data received over said trusted bus and to generate outgoing user data, said method comprising:

coupling said trusted bus with an untrusted bus of an untrusted domain using a hardware-implemented trusted domain controller to ensure that encrypted incoming user data received over said untrusted bus is forcibly decrypted by non-reprogrammable cipher hardware in the trusted domain controller and provided over said trusted bus as said incoming user data and to ensure that said outgoing user data is forcibly encrypted by non-reprogrammable cipher hardware in the trusted domain controller and provided over said untrusted bus as encrypted outgoing data; and in response to a request to initialize the trusted domain, clearing all data and executable code within the trusted domain and resetting the trusted data processing apparatus;

wherein said trusted domain controller provides a sole interface between said trusted domain and said untrusted domain.

* * * * *